US005668660A

United States Patent [19]
Hunt

[11] Patent Number: 5,668,660
[45] Date of Patent: Sep. 16, 1997

[54] MICROSCOPE WITH PLURAL ZOOM LENS ASSEMBLIES IN SERIES

[76] Inventor: Gary D. Hunt, 22851 Ridge Route Dr., Lake Forest, Calif. 92630

[21] Appl. No.: 346,028

[22] Filed: Nov. 29, 1994

[51] Int. Cl.[6] .................... G02B 21/00; G02B 23/00
[52] U.S. Cl. .................... 359/380; 359/363; 359/368; 359/432
[58] Field of Search .................... 359/368–390, 359/363, 432; 351/205–212

[56] References Cited

U.S. PATENT DOCUMENTS

| Re. 33,883 | 4/1992 | Ledley | 348/79 |
|---|---|---|---|
| 2,944,463 | 7/1960 | Rantsch | 359/386 |
| 3,458,244 | 7/1969 | Klein | 359/380 |
| 3,619,035 | 11/1971 | Horace | 359/679 |
| 4,111,530 | 9/1978 | Fuehrer et al. | 359/829 |
| 4,372,650 | 2/1983 | Lisfeld et al. | 359/829 |
| 4,515,439 | 5/1985 | Esswein | 359/381 |
| 4,617,467 | 10/1986 | Senftle et al. | 359/385 |
| 4,755,874 | 7/1988 | Esrig et al. | 348/126 |
| 4,787,734 | 11/1988 | Matsumura | 351/212 |
| 4,871,245 | 10/1989 | Ishikawa et al. | 359/388 |
| 4,900,145 | 2/1990 | Akiyama | 351/221 |
| 4,935,612 | 6/1990 | Bierleutgeb | 250/201.2 |
| 4,987,488 | 1/1991 | Berci | 348/77 |
| 5,002,376 | 3/1991 | Hoppl et al. | 359/377 |
| 5,098,426 | 3/1992 | Sklar et al. | 606/5 |
| 5,112,129 | 5/1992 | Davidson et al. | 356/359 |
| 5,134,662 | 7/1992 | Bacus et al. | 382/133 |
| 5,138,486 | 8/1992 | Meyer et al. | 359/363 |
| 5,146,363 | 9/1992 | Nagano | 359/363 |
| 5,226,903 | 7/1993 | Mizuno | 606/17 |
| 5,227,914 | 7/1993 | Hanzawa et al. | 359/377 |

FOREIGN PATENT DOCUMENTS

| 264911 | 10/1990 | Japan | 359/380 |
|---|---|---|---|
| 81715 | 4/1991 | Japan | 359/380 |

*Primary Examiner*—Thong Nguyen
*Attorney, Agent, or Firm*—Emrich & Dithmar

[57] ABSTRACT

A microscope includes an objective lens and a pair of zoom lenses arranged in series along an optical path from the objective lens to a video camera, which converts the output of the second zoom lens to a video signal for display of a magnified first image on an associated monitor. A portion of the output from the objective lens is split to a second video camera which generates a second video signal to display a second image on the monitor, of a different magnification from the first image. The objective is fixed on a holder which can be removably mounted in a receptacle on the microscope housing and retained therein by a manually releasable latch. An optical binocular eyepiece assembly has a prism which is selectively movable into the optical path to intercept the output of the second zoom lens. Illuminating visible light is transmitted from a remote source into the optical path and through the objective lens to illuminate the object viewed. A polarizer/analyzer unit is provided. A laser source directs a laser beam via a splitter into the optical path and thence to the objective lens. The splitter is movable between a use position in the optical path and a non-use position out of the optical path.

18 Claims, 6 Drawing Sheets

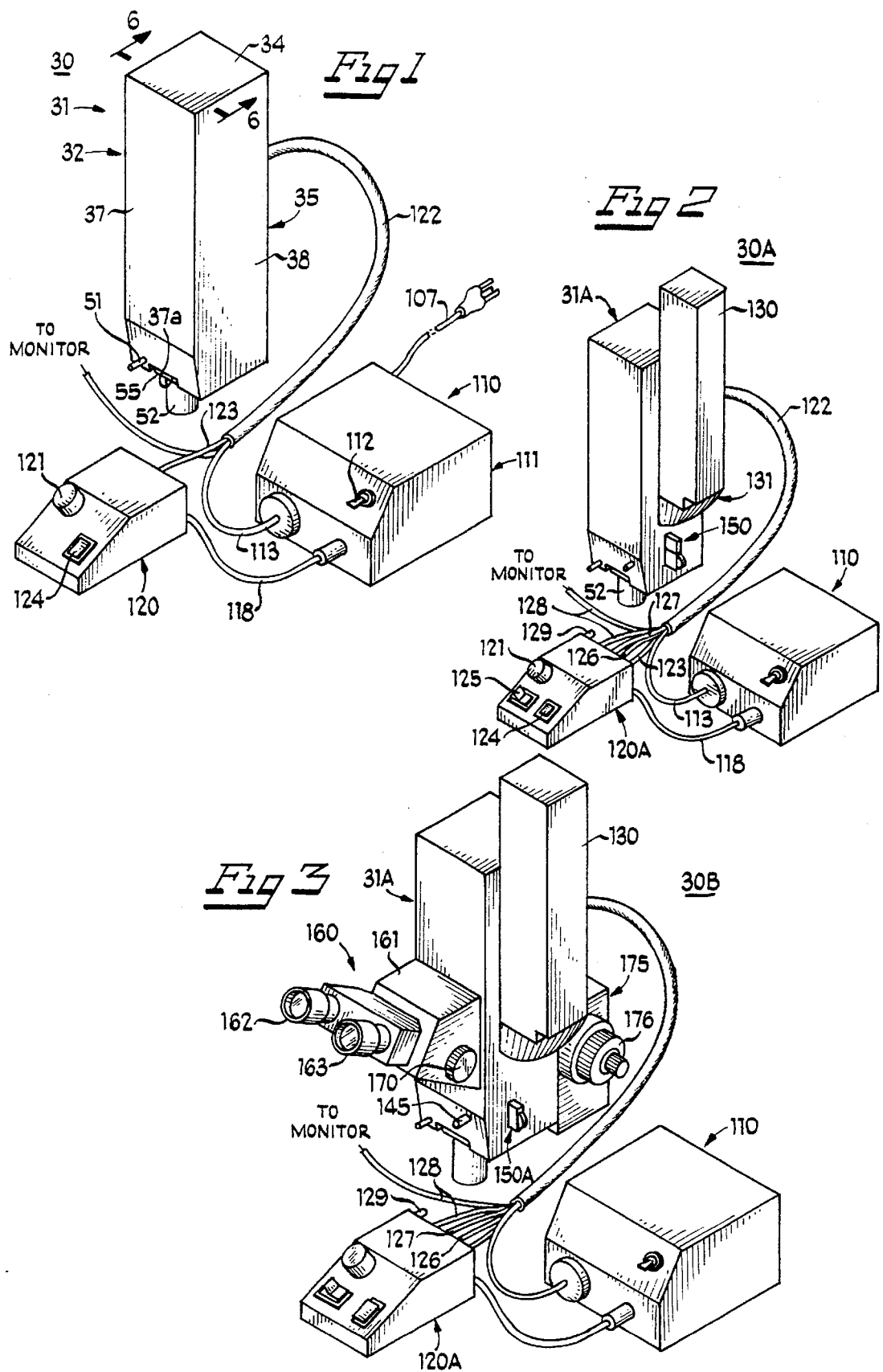

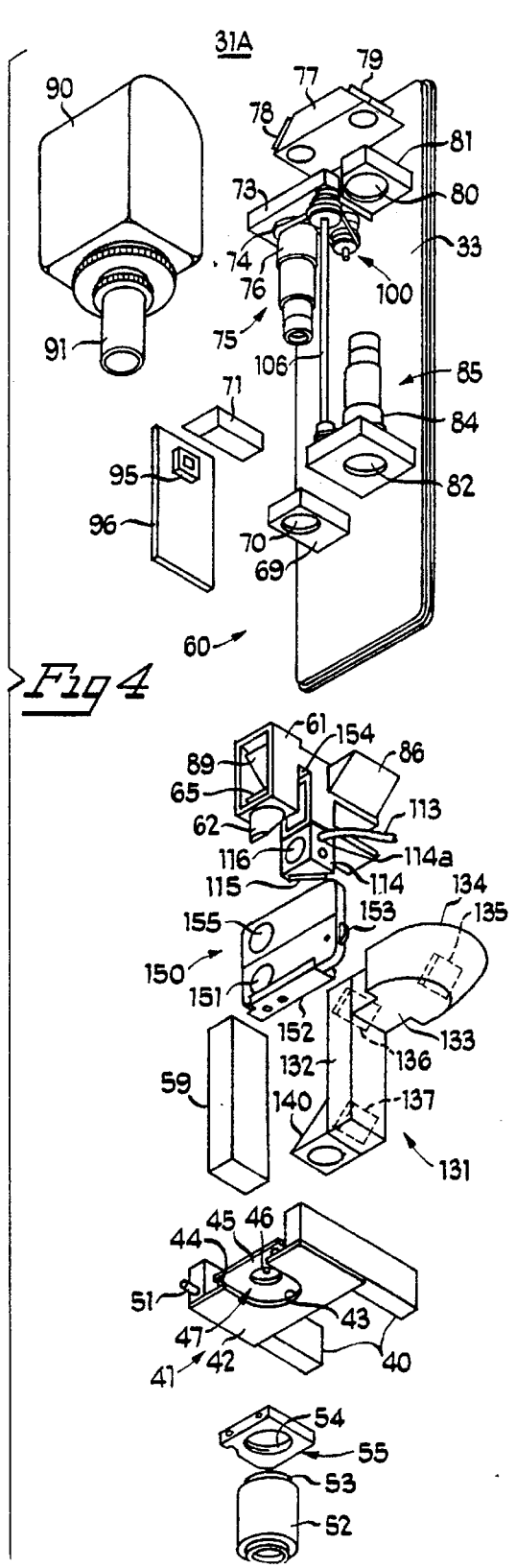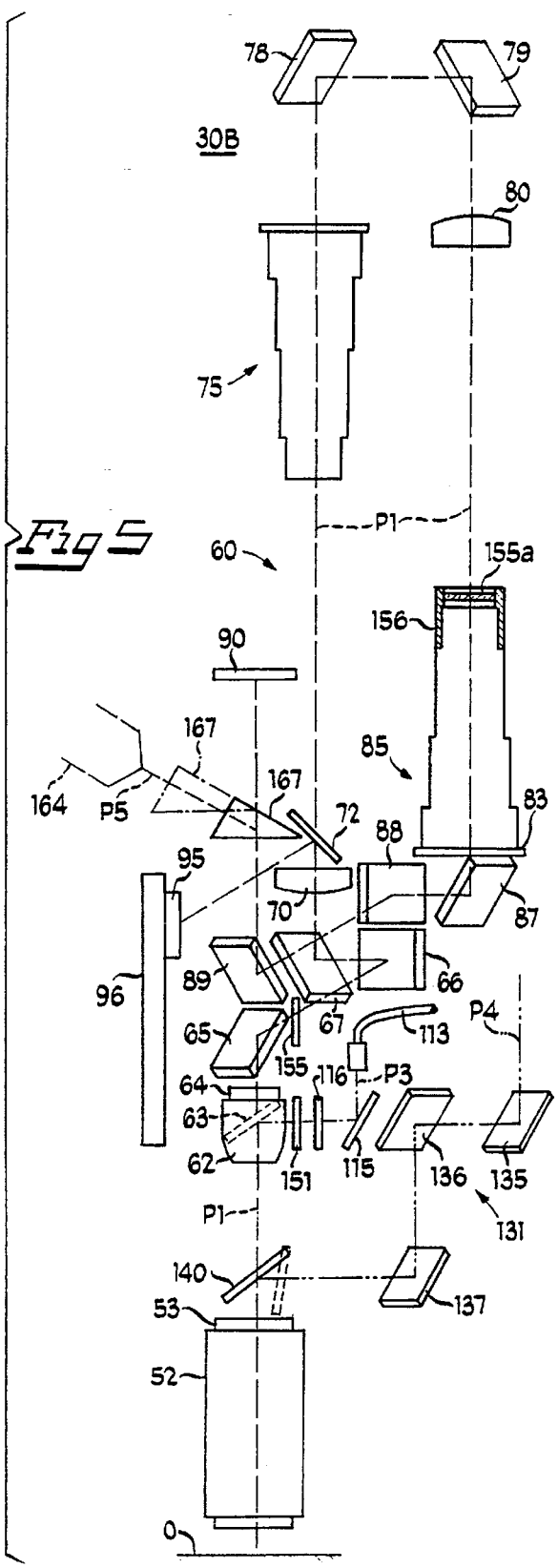

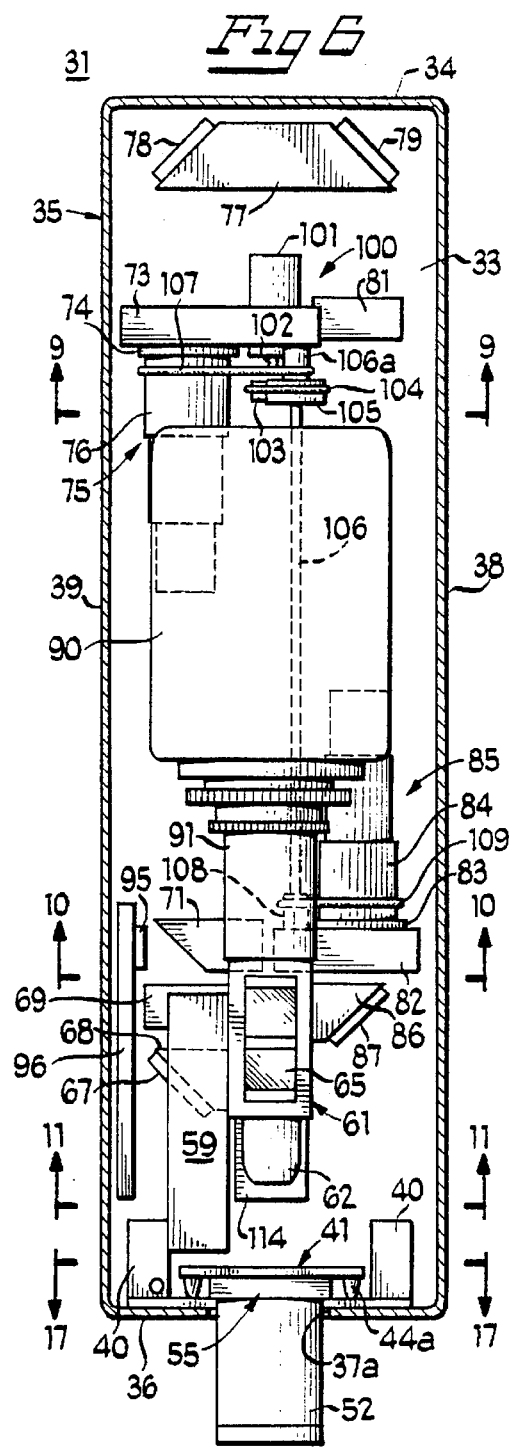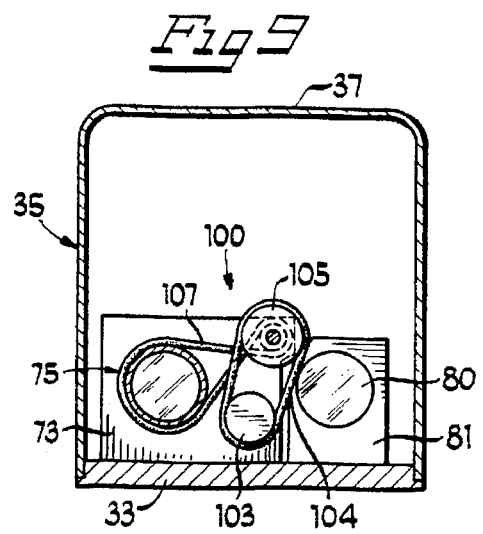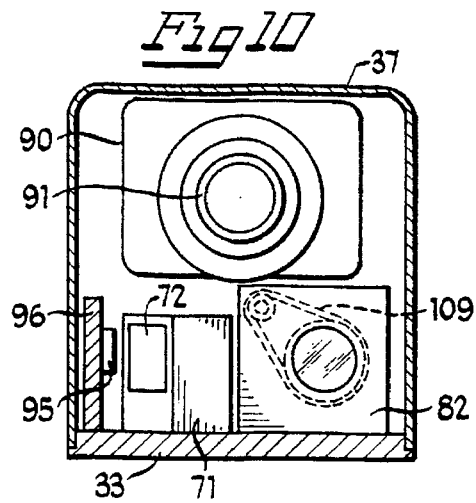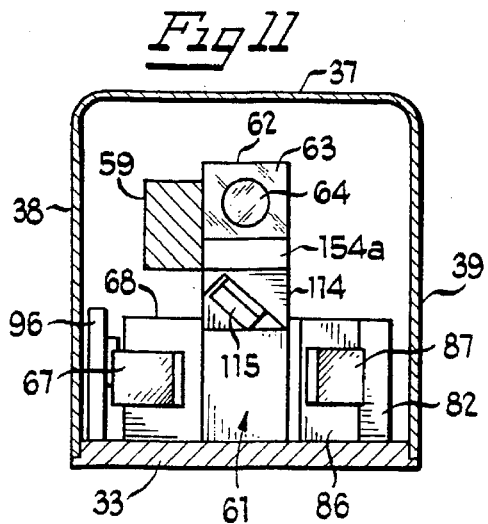

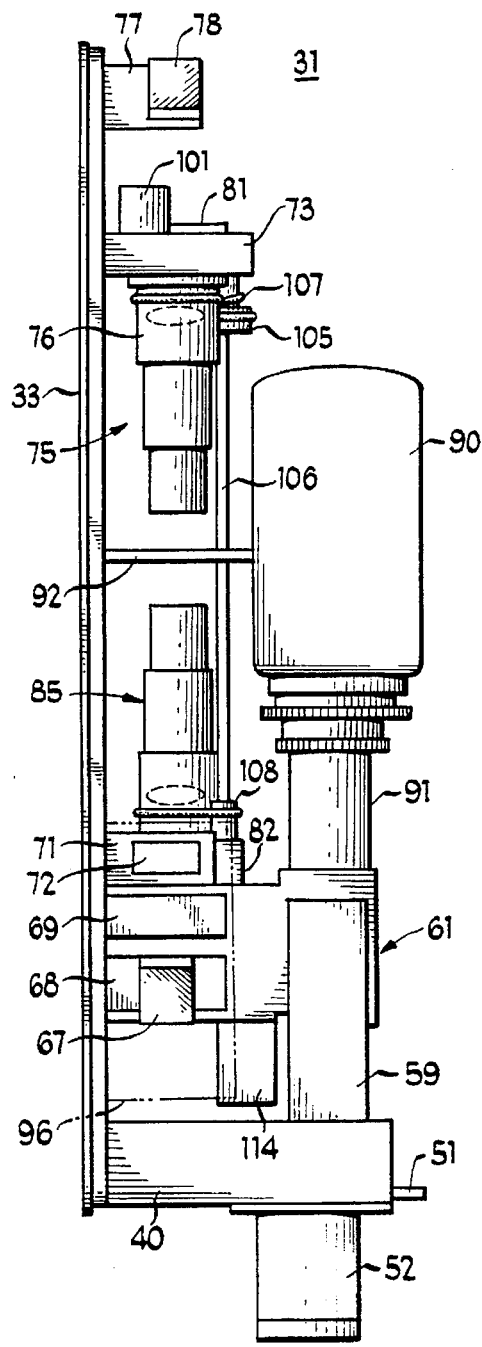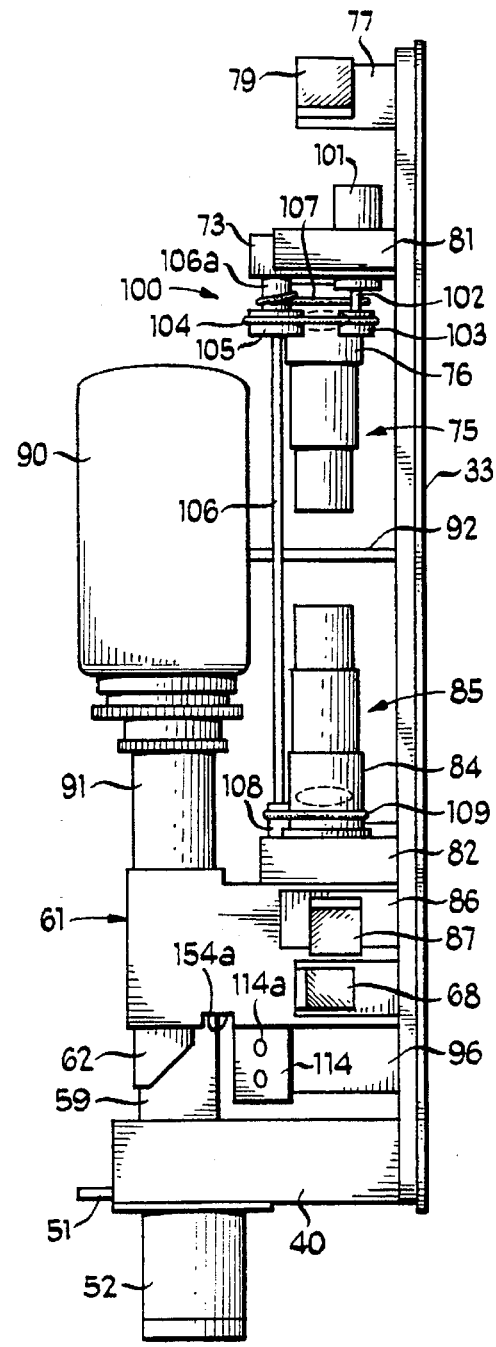

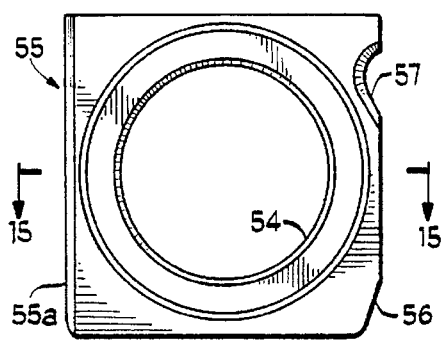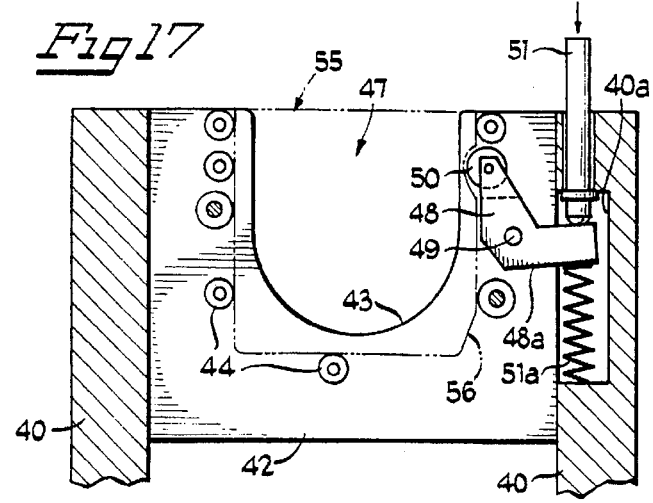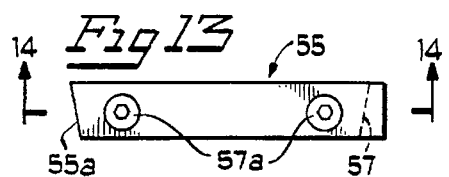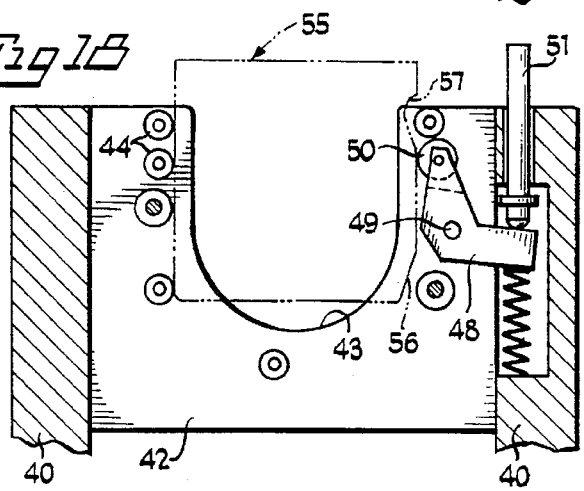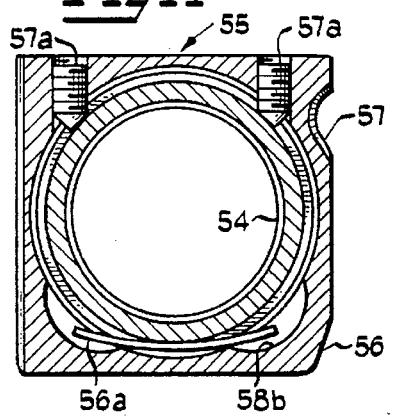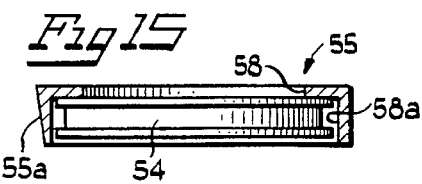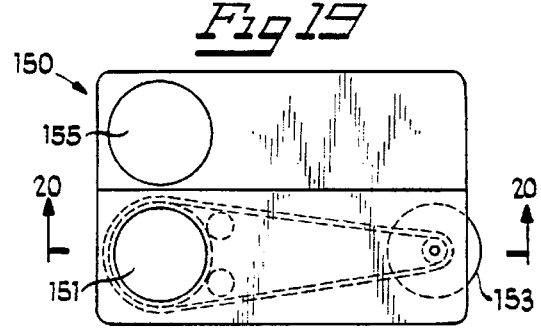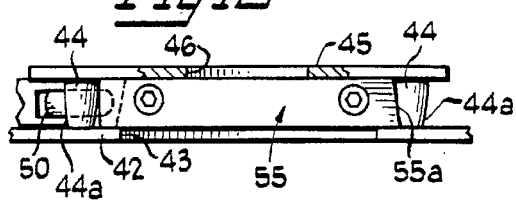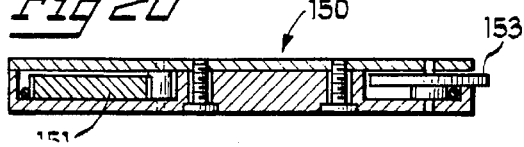

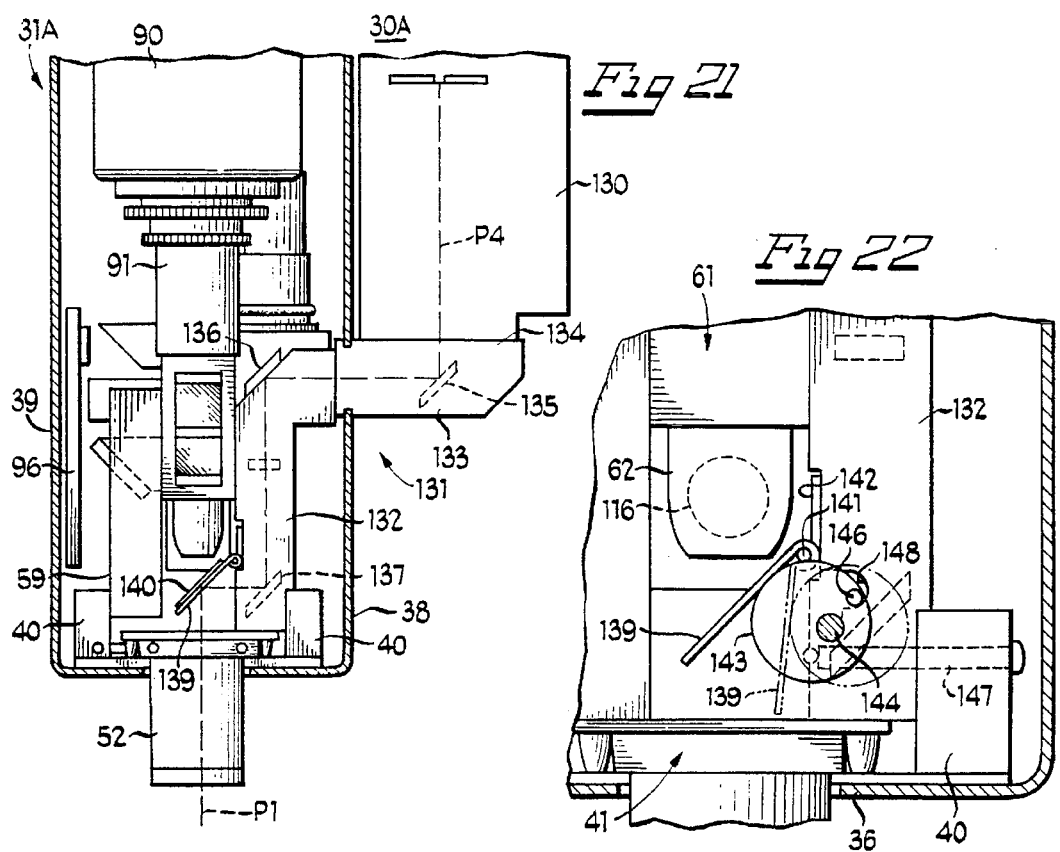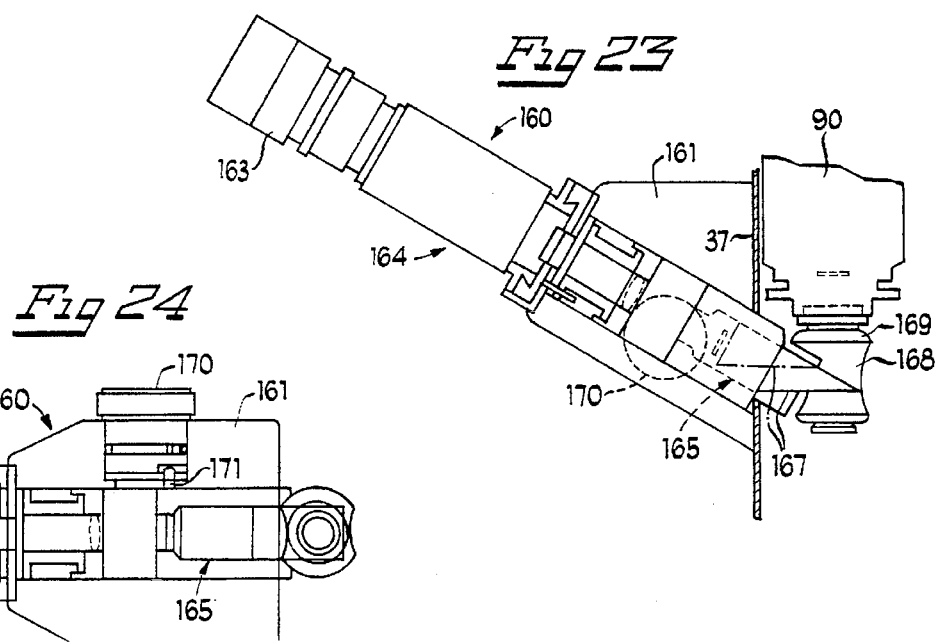

MICROSCOPE WITH PLURAL ZOOM LENS ASSEMBLIES IN SERIES

BACKGROUND OF THE INVENTION

1. Field of the Invention

The present invention relates generally to precision optical inspection apparatus and, more particularly to apparatus for performing microscopic inspection and measuring of workpieces, such as integrated circuits and the like. The invention has particular application to microscopes used in combination with electronic image processing devices, such as video cameras and monitors.

2. Description of the Prior Art

Variable magnification microscopes, of the type used in the fabrication of integrated circuit semiconductor devices and the like, typically include turret-mounted multiple objective lenses. Such a standard multiple-objective microscope is disadvantageous because the objective turret and its associated lenses occupy considerable space, which is at a premium in work on microelectronic circuits. This is because a large amount of peripheral equipment, including probes, environmental chambers and the like, must commonly be disposed in close proximity with the workpiece. This equipment is typically fitted around the various objective lenses. Therefore, whenever it is necessary to switch to a different magnification objective, it is necessary to move some or all of the peripheral equipment and/or to back off the microscope to clear the equipment, so that there is room to swing the desired objective into position.

In many cases frequent objective changing is necessary in order to simply allow the operator to keep track of the specific location on the overall workpiece where the work is being performed. Thus, initially the operator may have to use an objective giving a wide field of view in order to locate a particular region on the workpiece to be viewed and then would switch to a higher magnification to give a narrow field of view of the specific region of interest. Typically, each time the operator wishes to move the field of view to a different region of interest it may be necessary to switch back to a wide field of view objective to locate the next region. If the objective is sealed in an environmental chamber, it is necessary to unseal it and to reseal the new objective in the chamber and permit time for the new objective to acclimate to the environment.

It is known to provide a microscope with a single replaceable objective lens. While this does not occupy as much space as a turret-mounted array of objective lenses, typically the mounting and demounting of the objective lens in order to effect replacement is complicated and time consuming.

Frequently, lasers are used in the processing of microelectronic circuits for removing passivation, cutting lines and holes, and the like, as well as for failure analysis. Typically, the laser beam is passed through all of the optics of the microscope, which entails significant loss. Thus, only a small percentage of the laser light from the source may reach the workpiece.

SUMMARY OF THE INVENTION

It is a general object of the invention to provide an improved variable magnification microscope which avoids the disadvantages of prior microscopes while affording additional structural and operating advantages.

An important feature of the invention is the provision of a microscope of the type set forth, which can vary the magnification without moving any external part of the microscope housing relative to the object being viewed.

In connection with the foregoing feature, a further feature of the invention is the provision of a microscope of the type set forth, which permits variable magnification without moving or changing the objective lens.

A still further feature of the invention is the provision of a microscope of the type set forth which can provide either optical or electronic viewing outputs.

In connection with the foregoing features, a still further feature of the invention is the provision of a microscope of the type set forth, which can simultaneously provide different magnifications of an image of the object being viewed.

Another feature of the invention is the provision of a microscope of the type set forth with an associated laser light source arranged such that the laser beam passes only through the objective lens of the microscope optics.

Yet another feature of the invention is the provision of a microscope of the type set forth which provides for simple and quick mounting and demounting of objective lenses.

Certain ones of these and other features of the invention are attained by providing a microscope for receiving and magnifying light from an object along an optical path, the microscope comprising: an objective lens disposed in the optical path and producing an objective optical output having a predetermined magnification, a first zoom lens assembly disposed in the optical path for receiving and magnifying the objective optical output to produce a first zoom lens output, a second zoom lens assembly disposed in the optical path for receiving and magnifying the first zoom lens output to produce a second zoom lens output, and viewing means in the optical path for receiving the second zoom lens output to produce a viewing output.

Other features of the invention are attained by providing a microscope for receiving and magnifying light from an object, the microscope comprising: an observing optical assembly having a first optical path and including an objective lens which receives light reflected from the object to produce an objective optical output having a predetermined magnification, a laser light source producing a laser beam, and a laser optical assembly for transmitting the laser beam from the source along a second optical path, the laser optical assembly including a splitter disposed in the first and second optical paths for bending the laser beam from the second optical path into the first optical path and through the objective lens to the associated object and for transmitting the objective optical output from the objective lens along the first optical path.

Still further features of the invention are attained by providing a microscope for receiving and magnifying light from an object, said microscope comprising: a housing having a mounting portion defining a receptacle, a lens holder for carrying an objective lens and shaped and dimensioned to be removably inserted in the receptacle in a use position, first latch structure mounted on the mounting portion for movement between a latching position projecting into the receptacle and an unlatching position retracted from the receptacle, second latch structure on the holder, the first latch structure in its latching position being engageable with the second latch structure when the holder is disposed in its use position in the receptacle for retaining the holder in the receptacle, and release mechanism coupled to the first latch structure for selectively effecting movement thereof between its latching and unlatching positions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a perspective view of a microscope system constructed in accordance with and embodying the features of a first embodiment of the present invention;

FIG. 2 is a reduced view, similar to FIG. 1, of a microscope system in accordance with another embodiment of the present invention;

FIG. 3 is a view similar to FIG. 1 of a microscope system in accordance with yet another embodiment of the present invention;

FIG. 4 is an exploded perspective view of the optical assembly of the microscope of the system of FIG. 2;

FIG. 5 is an exploded, diagrammatic view of the optical components of the microscope of the system of FIG. 3, illustrating optical paths;

FIG. 6 is an enlarged view in vertical section taken along the line 6—6 in FIG. 1, and illustrating the microscope of the system of FIG. 1, modified to have a navigation camera included;

FIG. 7 is a side elevational view of the microscope of FIG. 6, as viewed from the left-hand side thereof, with the cover and navigation camera removed and with the position of the latter indicated in phantom;

FIG. 8 is a side elevational view of the microscope of FIG. 6, as viewed from the right-hand side thereof, with the cover removed;

FIG. 9 is a view in horizontal section taken along the line 9—9 in FIG. 6;

FIG. 10 is a view in horizontal section taken along the line 10—10 in FIG. 6;

FIG. 11 is a view in horizontal section taken along the line 11—11 in FIG. 6;

FIG. 12 is a top plan view of the objective lens holder of the microscope system of the present invention;

FIG. 13 is a front elevational view of the holder of FIG. 12;

FIG. 14 is a view in horizontal section taken along the line 14—14 in FIG. 13;

FIG. 15 is a view in vertical section taken along the line 15—15 in FIG. 12;

FIG. 16 is an enlarged, fragmentary, front elevational view of the lens mount receiver assembly of the microscope system of FIG. 1;

FIG. 17 is an enlarged, fragmentary view in horizontal section, taken along the line 17—17 in FIG. 6, and illustrating the lens mount receiver assembly with the cover plate thereof removed and with the lens holder of FIG. 12 shown mounted in place in phantom;

FIG. 18 is a view similar to FIG. 17 with the lens holder shown partially removed;

FIG. 19 is a front elevational view of the polarizer housing of the microscope system of FIG. 2;

FIG. 20 is an enlarged view in horizontal section taken along the line 20—20 in FIG. 19;

FIG. 21 is a fragmentary sectional view, similar to FIG. 6, of the lower portion of the microscope of FIG. 2, illustrating the laser optical assembly;

FIG. 22 is an enlarged, fragmentary view of a portion of the laser optical assembly of FIG. 21, illustrating the splitter control mechanism;

FIG. 23 is a fragmentary side elevational view in partial section of the microscope system of FIG. 3, illustrating the binocular optical viewing assembly thereof; and FIG. 24 is an enlarged, bottom plan view of the binocular optical viewing assembly of FIG. 23, with the binocular eyepieces thereof removed.

DESCRIPTION OF THE PREFERRED EMBODIMENTS

It is a significant aspect of the present invention that it provides a microscope system which is modular and includes a number of optional modules, so that the system can be arranged in a number of different system configurations, depending upon the options selected. Referring to FIG. 1, there is illustrated a basic microscope system, generally designated by the numeral 30, which includes the minimum components necessary in order to operate the system. The microscope system 30 includes a microscope 31, a remote light source/power supply 110, a control box 120 and associated cabling. The microscope 31 includes a single video camera and outputs a video signal which is fed to an associated CRT monitor (not shown) for viewing by the user in a known manner.

In FIG. 2, there is illustrated another microscope system 30A, which includes the basic components of the system 30 of FIG. 1, as well as three optional features. First, the system 30A utilizes a microscope 31A which is substantially the same as the microscope 31 of FIG. 1, except that it includes a second video camera and outputs two video signals. These signals are fed to a modified control box 120A which includes a switch 125 to select between the two signals, the selected signal being fed to the associated monitor for viewing. Second, the microscope system 30A includes a laser source 130 and an associated laser optical assembly 131 for directing a laser beam through the objective lens of the microscope 31A to the object being viewed. Third, the microscope system 30A includes a polarizer/analyzer mount 150. While three additional options have been illustrated in FIG. 2, it will be appreciated that any one or two of those options could be used with the basic microscope system 30 of FIG. 1.

Referring to FIG. 3, there is illustrated yet another microscope system 30B, which includes the second video camera and laser source options of the system 30A of FIG. 2, and a modified form of the polarizer/analyzer option of FIG. 2, as well as two additional options. First, whereas the systems 30 and 30A provide only video signal viewing outputs, the system 30B is provided with an optional binocular optical viewing assembly 160 which outputs an optical viewing image to be viewed directly by the user. Second, the microscope system 30B includes a focus block 175 for effecting vertical movements of the entire microscope 31A for focusing purposes. While five options have been illustrated in the microscope system of 30B, it will be appreciated that any one or any combination of these options could be used with the basic microscope system 30 of FIG. 1.

Referring now in particular to FIGS. 2 and 4–11, the microscope system 30A and, in particular, the microscope 31A thereof will be described in greater detail. In order to avoid proliferation of the drawing figures, different optional features are illustrated in different ones of these drawing figures. FIG. 4 includes all of the optional features of the microscope 31A, except that it shows a slightly modified form of laser optical assembly. FIG. 5 includes all of the optional features of FIG. 4, except that it shows the modified polarizer/analyzer arrangement of the microscope system 30B. It also includes the binocular optical viewing assembly option of the microscope system 30B of FIG. 3. FIGS. 6–11 illustrate the microscope 31A of FIG. 2, except that they omit the laser optical assembly and polarizer/analyzer options. In other words the microscope illustrated in FIGS. 6–11 is the basic microscope 31 of FIG. 1, with the addition of only the second video camera and is, therefore, designated 31 in those figures. It will be appreciated that most of the internal construction of the microscopes 31 and 31A are common to each other. Thus, the designation 31 will generally be used hereinafter, except where the laser source option is illustrated, in which case the reference 31A will be used.

The microscope 31 has a box-like housing 32 including a flat rectangular back plate 33, to which is mounted an open-backed cover 35, including a top wall 34 (FIG. 6), a bottom wall 36, a front wall 37 and opposed side walls 38 and 39 (FIGS. 6–11). An opening 37a (FIGS. 1 and 6) is formed in the cover 35 at the junction between the front wall 37 and the bottom wall 36 for a purpose to be described more fully below.

Fixedly secured to the back plate 33 at the lower end thereof and projecting forwardly therefrom are laterally spaced-apart mounting blocks 40 (FIGS. 4 and 6) which support therebetween a lens mount receiver assembly 41. The receiver assembly 41 includes a base plate 42 fixedly secured beneath the mounting blocks 40 and immediately above the bottom wall 36 of the housing 32, the base plate 42 having a U-shaped notch 43 formed centrally of the front edge thereof. Supported a slight distance above the base plate 42 by a plurality of spacer rollers 44 is a rectangular cover plate 45, which has a circular hole 46 formed therethrough centrally thereof and substantially coaxially with the curved portion of the U-shaped notch 43. The plates 42 and 45 cooperate to define therebetween a receptacle 47 (FIG. 4). Preferably, the spacer rollers 44 have tapered lower ends 44a (see FIGS. 6 and 16).

Referring also to FIGS. 16–18, the receiver assembly 41 includes a crank-type latch lever 48 mounted for pivotal movement on a pivot pin 49 fixed to the base plate 42. One arm 48a of the latch lever 48 projects into a recess 40a formed in the adjacent one of the mounting blocks 40, while the other arm thereof carries at its distal end a circular latch cam 50 which projects slightly into the receptacle 47. A release button 51 bears against the forward surface of the latch lever arm 48a and extends forwardly through a bore in the mounting block 40 and through an associated opening in the front wall 37 of the cover 35. A helical compression spring 51a is seated in the recess 40a and biases the latch lever arm 48a against the release button 51 to a normal latching position, illustrated in FIG. 17. When the release button 51 is depressed, in the direction of the arrow in FIG. 17, it pivots the latch lever 48 clockwise to a release position shown in FIG. 18, wherein the latch cam 50 is retracted from the receptacle 47. While manual latch release is shown, remotely controlled release could also be provided.

The receiver assembly is for the purpose for receiving and retaining an objective lens 52, which is preferably provided with an externally threaded mounting end 53 (FIGS. 4 and 5), whereby the lens 52 may be threadedly engaged in an internally threaded insert 54 in a lens holder 55. Referring also to FIGS. 12–15, the lens holder 55 is a substantially rectangular block of metal, which has a tapered cam surface 56 truncating one rear corner thereof, and an arcuate latch notch 57 formed adjacent to a front corner thereof on the same side as the cam surface 56. Preferably, the opposite side of the holder 55 is beveled or inclined, as at 55a. The holder 55 has a circular bore 58 formed centrally therethrough with an enlarged-diameter counterbore 58a, defining a shoulder against which the annular threaded insert 54 is seated. The counterbore 58a has lobes 58b at one side thereof, defining cups which seat a leaf spring 56a (FIG. 14), which biases the insert 54 forwardly against a pair of set screws 57a threadedly received in complementary bores at the front of the holder 55.

In use, the objective lens 52 is threadedly engaged in the insert 54, and the holder 55 is then releasably received in the receptacle 47 of the receiver assembly 41, as shown in FIGS. 16–18. More specifically, the holder 55 is inserted into the receptacle 47 with the cam surface 56 facing the latch cam 50, to allow the holder 55 to cam past the latch cam 50, with the latch lever 48 pivoting clockwise to accommodate this passage (see FIG. 18). The lower edge of the beveled side 55a fits beneath the tapered lower ends 44a of the adjacent ones of the spacer rollers 44 to cam the holder down against the base plate 42. When the holder 55 is fully seated in the receptacle 47, the latch cam 50 snaps back out into the latch notch 57 to retain the holder 55 in place and to bias it toward the opposite rear corner of the receptacle 47. The set screws 57a cooperate with the spring 56a to permit adjustment of the objective lens 52 to center it after it has been mounted in the receptacle 47. When it is desired to remove the objective lens 52, the release button 51 is depressed, pivoting the latch lever 48 to its release position, thereby accommodating quick and easy removal of the holder 55 from the receptacle 47.

It will be appreciated that if desired, a plurality of holders 55 may be provided for attachment, respectively, to a plurality of objective lenses 52. Thus, whenever it is desired to replace an objective lens the lens/holder can be quickly and easily snapped into place. It will also be appreciated that the microscope 31 is normally mounted at an associated work station in a position such that the objective lens 52, when mounted in position in the receptacle 47, will be disposed for properly viewing an associated object below (see FIG. 5).

It is a significant aspect of the invention that, while the objective lens 52 can be quickly and easily replaced, in normal operation the changing of objective lenses is not necessary to obtain changes in magnification. Rather, a single objective lens will be used and variations in magnification will be obtained by the use of a pair of ganged zoom lens assemblies. Referring again to FIGS. 4–11, the microscope 31 includes an optical assembly 60. In particular, a support block 59 is fixed to one of the mounting blocks 40 and projects upwardly therefrom within the housing 32 for attachment to one side of a reflector housing 61, which is fixed to the back plate 33. Depending from the front end of the reflector housing 61 is a truncated cylindrical lens mount 62 which carries a splitter 63 and a lens 64 (FIG. 5). Mounted in the reflector housing 61 are a front reflector 65 and a rear reflector 66. A side reflector 67 is mounted in a reflector mount 68 (FIGS. 6 and 11) attached to one side of the reflector housing 61.

Attached to the reflector housing 61 immediately above the reflector mount 68 is a lens mount 69 which carries a field lens 70 for a first zoom lens assembly 75. Mounted on the reflector housing 61 immediately above the field lens mount 69 is a splitter mount 71 (FIGS. 4, 6 and 10) which carries a splitter 72 (FIG. 5). Mounted adjacent to the upper end of the back plate 33, vertically above the splitter mount 71, is a mounting block 73 which has an aperture therethrough and on which a base 74 of the zoom lens assembly 75 is mounted. The zoom lens assembly 75 includes a rotatable cam member 76 for varying the magnification thereof. Mounted at the top of the back plate 33 is a reflector mount 77 carrying reflectors 78 and 79, with the reflector 78 disposed immediately above the zoom lens assembly 75. Disposed immediately beneath the reflector 79 adjacent to the mounting block 73 is a lens mount 81 support in a field lens 80 for a second zoom lens assembly 85. More specifically, a mounting block 82, which has an aperture therethrough, is disposed slightly above the reflector housing 61 and has mounted thereon a base 83 of the zoom lens assembly 85, that assembly also having a rotatable cam member 84 for varying the magnification thereof. Fixed to the side of the reflector housing 61 immediately beneath the field lens 80 is a reflector mount 86 carrying a reflector 87. Mounted inside the reflector housing 61 are reflectors 88 and 89.

Referring to FIG. 5, the optical assembly 60 cooperates with the objective lens 52 to define an optical path P1 from the viewed objects O, through the objective lens 52, the splitter 63 and the lens 64 to the reflector 65, and thence to the reflector 66 and the reflector 67, through the field lens 70 and the splitter 72 to the first zoom lens assembly 75. The optical path P1 then passes to the reflector 78 and the reflector 79 and through the field lens 80 to the second zoom lens assembly 85. From the zoom lens assembly 85, the optical path P1 passes to the reflector 87, and then the reflectors 88 and 89 to a color video camera 90. More specifically, the path passes to the input of the color video camera 90 through an entry tube 91 (FIGS. 4 and 6), which closes the space between the camera 90 and the top of the reflector housing 61. Thus, it can be seen that the optical path P1 is a folded path, with the zoom lens assemblies 75 and 85 being disposed in series along parallel legs of the path. The camera 90 is supported on the back plate 33 by a standoff rod 92 (FIGS. 7 and 8). The camera 90 is a high resolution, CCD, digital, color camera, which produces a color video output signal in a known manner. It will be appreciated that the optical image received by the video camera 90 is magnified, not only by the objective lens 52, but also by the two zoom lens assemblies 75 and 85, which are arranged in series along the optical path P1.

The microscope 31A of FIG. 2 includes, in addition to the color video camera 90, a black-and-white video camera 95 (FIGS. 4–6) which is a CCD, high resolution camera mounted on a camera circuit board 96 which is, in turn, mounted by suitable means to the back plate 33 within the housing 32. As can be seen in FIG. 5, the splitter 72 splits a portion of the image from the objective lens 52 out of the optical path P1 and into a second optical path P2 to the black-and-white video camera 95 which, in turn produces a black and white video output signal in a known manner. It will be appreciated that, since the signal to the optical image input to the camera 95 is split off before passing through the zoom lens assemblies 75 and 85, it has only the magnification imparted by the objective lens 52. Thus, the video camera 95 serves as a navigation camera, generating a wide-field-of-view image of the viewed object O on an associated monitor to assist in location of a specific site of interest. On the other hand, it will be appreciated that the video camera 90 gives a highly magnified, narrow-field-of-view image of the precise cite of interest on the viewed object O. It will be appreciated that this affords important advantages to the user, which will be explained in greater detail below.

Referring in particular to FIGS. 4, 6, 9 and 10, the microscope 31 includes a zoom drive assembly 100 for the zoom lens assemblies 75 and 85. More specifically, a reversible electric motor 101 is mounted in a suitable aperture in the mounting block 73 and has an output shaft 102 (FIGS. 6 and 8) to which is fixed a pulley 103. A drive belt 104 is trained around the pulley 103 and around a pulley 105 fixed on an elongated drive rod 106, which is rotatably mounted between the mounting blocks 73 and 82. Also fixed to the rod 106 immediately above the pulley 104 is a pulley 106a. A belt 107 is trained in "figure 8" configuration around the pulley 106a and the rotatable cam member 76 of the zoom lens assembly 75. Fixed to the lower end of the rod 106 is a pulley 108. A belt 109 is trained around the pulley 108 and the rotatable cam member 84 of the zoom lens assembly 85. It will be appreciated that, when the shaft of the motor 101 is rotated, there results a corresponding rotation of the rod 106, which effects a simultaneous ganged operation of the zoom lens assemblies 75 and 85 for varying their magnification in tandem. A gear drive could be provided instead of the belt drive. Also, while this ganged arrangement is the preferred embodiment of the invention, it will be appreciated that, if desired, the zoom lens assemblies 75 and 85 could be independently operated by separate drive motors. Furthermore, the zoom lens assemblies could be operated manually, if desired.

Referring again to FIGS. 1–3, the remote light source/power supply 110 includes a housing 111 which contains a suitable source of DC power for the zoom drive motor 101 and for the video cameras 90 and 95. It also contains a suitable source of visible illumination light for illuminating the object O to be viewed, and is provided with a power switch 112. The illuminating light is fed via a fiber optic cable 113 to the microscope 31 or 31A. More specifically, referring to FIGS. 4–8, 6 and 11, the microscope 31 is provided with an illumination block 114 fixed to the bottom of the reflector housing 61 rearwardly of the lens mount 62. The fiber optic cable 113 is provided with a suitable output lens fitting which is fitted into an aperture 114a in the side of the illumination block 114 (FIGS. 4 and 8). The illuminating light is directed to a reflector 115 and thence through a lens 116, both housed in the illumination block 114, along a path P3 (FIG. 5) to the splitter 63, which reflects or bends the illumination light into the optical path P1 and through the objective lens 52 to the viewed object O. The remote light source/power supply 110 is provided with an AC power cord 117 (FIG. 1) adapted to be plugged into an associated suitable power source, such as AC power from 100–240 volts. Alternatively, a DC source could be used. The power switch 112 turns on the power supply.

The power supply 110 produces both low-voltage AC power and DC power which are fed over a multiple-conductor remote cable 118 to either the control box 120 or the control box 120A, depending upon whether the microscope 31 or the microscope 31A is being used. In either case, the low voltage AC power from the remote cable 118 is coupled through a rheostat controlled by an ON/OFF intensity knob 121 and is then fed back out through the cable 118 to the light source for remote control thereof. The DC power is fed over two parallel paths. The first path goes directly out over a multiple-conductor power cable 123 to the cameras 90 and 95. Preferably, the power cable 124 is bundled with the fiber optic cable 113 and associated other cables leading to and from the microscope 31 through an encompassing cable sheath 122. The second path is applied through a zoom control switch 124 in the control box 120 or 120A, and then out over the power cable 123 to the motor 101. The switch 124 has a home OFF position and two actuating positions and controls the direction of the DC motor 101 for zooming in or zooming out to increase or decrease magnification by the zoom lens assemblies 75 and 85, the motor being powered for as long as the switch 124 is held actuated.

In the microscope 31A, which incorporates the navigation camera 95, the control box 120A must be used (FIG. 2). This control box includes two additional control elements. The first is a video switch 125 with switches between the video signals from the two cameras 90 and 95. In particular, the zoom and navigation video signals are, respectively, fed over video cables 126 and 127 to the control box 120A and are then applied through the switch 125 to the video output cable 128, which passes from the control box 120A back up into the cable sheath 122, where it makes a U-turn and goes back out to the associated CRT monitor (not shown). Thus, it will be appreciated that, by operation of the video switch 125, the user can select which of the two video signals is viewed on the monitor. However, it will be appreciated that, if desired, the two video signals could, respectively, be fed to separate monitors, in which case the switch 125 would not be necessary. Alternatively, the two video signals could be fed to a single CRT monitor via a split-screen arrangement in a known manner, so that they could be viewed simultaneously on the same screen.

The other additional control element on the control box 120A is a navigation camera rheostat knob 129. In this case, the low-voltage AC power supplied over the cable 118 is fed in parallel to two different rheostats, one controlled by the control knob 121 in the event that the viewed image is from the color video camera 90, and the other being controlled by the control knob 129 in the event that the viewed image is from the navigation camera 95.

Referring to FIGS. 2–5, 21 and 22 in the event that the laser source 130 is used, it is mounted alongside the microscope housing 32 on the laser optical assembly 131. The laser optical assembly 131 includes a reflector housing 132, a portion of which is disposed within the microscope housing 32. The reflector housing 132 is provided with an extension 133 which projects laterally outwardly through an aperture in the microscope housing side wall 38 to provide a support platform 134 on which the housing of the laser source 130 is seated, being secured in place by suitable means. The laser optical assembly 131 includes a reflector 135 disposed in the extension 133, and reflectors 136 and 137 disposed in the reflector housing 132.

The laser optical assembly 131 also includes a splitter 140 which, in the preferred embodiment, is mounted on a pivoting support plate 139, mounted for pivotal movement about a hinge pin 141 carried by the reflector housing 132 to accommodate pivotal movement of the splitter 140 between a use position, illustrated in solid line in FIGS. 21 and 22, and a non-use position illustrated in broken line in FIG. 22. Preferably, a torsion spring 142 is provided around the hinge pin 141 to resiliently bias the splitter plate 139 to its non-use position. There is also provided a circular control cam 143 (FIG. 22) mounted for rotation about the axis of an eccentrically-mounted pivot pin 144, which extends forwardly through a complementary opening in the microscope housing front wall 37 for attachment to a manually rotatable control knob 145 (FIG. 3). The control cam 143 bears against the splitter plate 139 and shifts between a non-use position, illustrated in broken line in FIG. 22, and a use position, illustrated in solid line in FIG. 22, for effecting movement of the splitter 140 to its use position against the urging of the bias spring 142. Preferably, the control cam 143 carries a stop pin 146 which, in the use position, is stopped against an adjustable stop screw 147 extending into the reflector housing 132 from the associated mounting block 40, and which, in the non-use position, seats in a retaining recess 148 formed in the reflector housing 132 for retaining the splitter in its non-use position.

Referring to FIGS. 5 and 21, the laser beam from the laser source 130 is directed along a path P4 to the reflector 135, then to the reflector 136, then to the reflector 137 and then to the splitter 140 which, in its use position, reflects the laser beam into the optical path P1 and through the objective lens 52 to the viewed object O. Preferably, the laser source 130 will be energized only when it is intended to be used and, therefore, when the splitter 140 is disposed in its use position. In order to prevent damage to the laser in the event that it is energized when the splitter 140 is in its non-use position, recess 148 is so positioned that, in its non-use position, the splitter 140 will not be disposed perpendicular to the path P4, thereby preventing the laser beam from reflecting back upon itself.

While this movable splitter 140 is preferred, it will be appreciated that, if desired, the splitter 140 could be mounted in a permanently fixed use position, as indicated, for example, in FIG. 4. This would afford a mechanically simpler, but less efficient arrangement, since the illuminating light from the light source 110 and the reflected image from the viewed object O would always have to pass through the splitter 140, even when the laser is not in use.

It is a significant aspect of the invention that the splitter 140 is disposable in the optical path P1 between the objective lens 52 and the splitter 63. Thus, the laser beam passes through only the objective lens 52 and not through any part of the optical assembly 60. Thus, there is minimal attenuation of the laser beam, providing for much more efficient operation than prior systems wherein the laser beam was passed through the entire microscope optics.

Referring now to FIGS. 2, 19 and 20, the microscope 131A may be provided with a polarizer/analyzer mount 150 adapted to be received through a complementary opening in the side wall 38 of the microscope housing 32. The mount 150 comprises a substantially rectangular housing divided into upper and lower halves, the lower half carrying a polarizer 151 and being adapted to slide along a support bracket 152 (FIG. 4) mounted beneath the reflector housing 61. The polarizer 151 is rotatable by means of an associated belt controlled by an adjustment knob 153 which projects laterally beyond the end of the polarizer/analyzer mount 150 in a known manner. An analyzer 155 is disposed in the upper part of the mount 150 immediately above the polarizer 151. When the mount 150 is disposed in place in the microscope housing 32, it fits into a groove 154 formed in the bottom of the reflector housing 61 just forwardly of the illumination block 114 and between the reflectors 65 and 66. More specifically, when thus mounted in place, the polarizer 151 will be disposed in the illuminating light path P3 between the lens 116 and the splitter 63 (see FIG. 5), while the analyzer 155 will be disposed in the optical path P1 between the reflectors 65 and 66. Thus, the incident illuminating light will be polarized and the reflected image from the viewed object O will be analyzed in a known manner.

While this common mounting of the polarizer and analyzer is preferred, an alternative arrangement could be provided. Referring to FIGS. 3 and 5, an alternate polarizer mount 150A consists of only the lower half of the mount 150, housing only the polarizer 151. In this event, it will be appreciated that the groove 154 in the bottom of the reflector housing 61 could be much shallower. An analyzer 155A is separated from the polarizer 151 and, preferably, is mounted on a mount 156 fitted over the inlet end of the zoom lens assembly 85, as shown in FIG. 5.

Referring now to FIGS. 3, 5, 23 and 24, the binocular optical viewing assembly 160 of the microscope system 30B will be described. The viewing assembly 160 includes a housing 161 which is fixed to the front wall 37 of the microscope housing 32 by suitable means. The optical viewing assembly 160 also includes a pair of eyepiece lens assemblies 162 and 163 and a common optical assembly 164, which are releasably mounted on the front of the housing 161 and project forwardly therefrom. Mounted in the housing 161 is a carriage 165 which reciprocates forwardly and rearwardly between use and non-use positions. Fixed to the forward end of the carriage 165 is a prism 167 which, in the use position (illustrated in solid line in FIG. 23) projects into a hole 168 through a modified tube 169 coupling the reflector housing 61 to the optical input of the color video camera 90. In its use position, the prism 167 is disposed in the optical P1 from the reflector 89 to the camera 90 (see FIG. 5). When the carriage 165 is retracted to its non-use position, the prism 167 is disposed in the broken-line position illustrated in FIGS. 5 and 23, out of the optical path P1. It will be appreciated that, when in its use position, the prism 167 bends or deflects the image from the reflector 89 out of the optical path P1 into a path P5 to the optical assembly 164. Thus, when the prism 167 is disposed in its non-use position, the optical image is passed to the camera 90, while when the prism 167 is in its use position, the optical image is passed to the binocular viewing assembly 160 for direct optical viewing by a user.

In order to effect this movement between the use and non-use positions, the optical viewing assembly 160 includes a control knob 170 rotatably mounted on the side of the housing 161. Projecting inwardly from the control knob 170 parallel to its axis of rotation is a drive pin 171, one end of which is seated in a slot 172 in the control knob 170 and the other end of which passes through an elongated slot in the housing 161 and engages the carriage 165. Thus, it will be appreciated that, as the control knob 170 is rotated, the drive pin 171 moves radially inwardly of the knob 170 and axially of the carriage 165 to effect axial movement of the carriage 165 between the use and non-use positions.

The focus block 175 of the microscope system 30B (FIG. 3) includes a housing which is mounted on a fixed support relative to the associated object O being viewed, and includes a movable portion coupled by suitable means to the back plate 33 of the microscope housing 32. The fixed and movable portions of the housing 161 are interconnected by a suitable drive mechanism, such as a rack and pinion mechanism, with the rack (not shown) on the movable portion and a pinion coupled to the control knob 170 for rotation to effect vertical movements of the movable portion and the microscope housing 32 for focusing purposes in a known manner.

The overall operation of the present invention will now be described in the context of the microscope system 30B of FIG. 3, which is the most comprehensive of the disclosed systems. The operator, after having set up the object O to be viewed, turns on the power switch 112 of the remote light source/power supply 110 switches the switch 125 to the navigation camera 95 and adjusts the control knob 129 of the control box 120A to illuminate the object and then performs the necessary focusing by use of the focus block 175. The operator then locates the work region of interest on the object O, makes any necessary adjustments of the object stage and then switches to the zoom camera 90, adjusting illumination with the control knob 121. Refocusing should be unnecessary, since the zoom lenses and the navigation camera are parfocal. If focusing is necessary, it is effected with the focus block 175. For this purpose, the operator can utilize the image on the CRT monitor or can utilize the binocular optical viewing assembly 160 to directly view the object image. The operator uses the zoom switch 124 to obtain the proper magnification by adjustment of the zoom lens assemblies 75 and 85.

If the laser source 130 is to be used, the operator first operates the control knob 145 to move the splitter 140 to the use position, and then powers up the laser source 130 by suitable means (not shown). If, at any time, it should become necessary to change the objective lens 52, it is necessary to only depress the release button 51 and manually pull out the lens holder 55 and then snap in a new one.

While the preferred embodiment shown is arranged in a reflected light configuration, with the light source on the same side of the viewed object as the viewing optics, it will be appreciated that it could also be arranged in a transmitted light configuration, with the light source and the viewing optics respectively on opposite sides of the viewed object.

From the foregoing, it can be seen that there has been provided an improved microscope which utilizes a single objective lens and provides for variation of magnification without changing objective lenses. The microscope system is of modular construction, affording a number of selectable optional features. In particular, the user can select between optical and video viewing outputs and, in the latter case, can select between two different video outputs, respectively providing different magnifications of the same image. A laser source and a polarizer/analyzer combination may be included, with the optical assembly of the laser being manually switchable between use and non-use configurations, and with the laser beam passing only through the objective lens.

I claim:

1. A microscope for receiving light from an object along an optical path and magnifying an image of the object, said microscope comprising: a first zoom lens assembly disposed in a first housing in the optical path for receiving and enlarging an image of the object to produce a first zoom lens output, a second zoom lens assembly disposed in a second housing in the optical path spaced from the first housing for receiving and further enlarging the first zoom lens output to produce a second zoom lens output, and viewing means in the optical path for receiving the second zoom lens output to produce a viewing output.

2. The microscope of claim 1, and further comprising a plurality of reflectors disposed in the optical path for folding the optical path into a plurality of legs, said first and second zoom lens assemblies being respectively disposed in parallel legs of the optical path.

3. The microscope of claim 1, and further comprising a drive assembly coupled to said first and second zoom lens assemblies for effecting operation thereof to vary the magnification thereof.

4. The microscope of claim 3, wherein said drive assembly includes a single drive motor coupled to said first and second zoom lens assemblies for simultaneous ganged operation thereof.

5. The microscope of claim 1, and further comprising an objective lens in the optical path between the object and said first zoom lens assembly.

6. The microscope of claim 5, and further comprising a mounting assembly for removably mounting said objective lens, said mounting assembly includes a base defining a receptacle, and a holder for carrying said objective lens and removably receivable in the receptacle.

7. The microscope of claim 5, and further comprising a splitter disposed in the optical path for splitting the objective optical output into first and second output portions and transmitting only the second output portion along the optical path to said first zoom lens assembly, said viewing means including first and second video cameras, said first video camera receiving the first output portion and generating a first video output signal, said second video camera receiving the second zoom lens output and generating a second video output signal.

8. The microscope of claim 1, and further comprising a source of illuminating light, and an illuminating optical assembly for transmitting the light from said source into the optical path for illuminating the object.

9. The microscope of claim 8, wherein the optical path is a first optical path, said illuminating optical assembly having a second optical path and including a splitter disposed in said first and second optical paths, said splitter bending light from said second optical path into said first optical path and transmitting the light from the object along said first optical path.

10. The microscope of claim 8, and further comprising a polarizer disposed in said illuminating optical assembly for polarizing the illuminating light from said source before it enters the optical path, and an analyzer disposed in the optical path at a location further from the object than the location at which the incident illuminating light enters the optical path.

11. The microscope of claim 10, and further comprising a common mount supporting said polarizer and said analyzer adjacent to each other.

12. The microscope of claim 1, and further including a laser light source producing a laser beam, and a laser optical assembly for transmitting the laser beam from said laser light source into said optical path to the object.

13. The microscope of claim 1, wherein said viewing means includes a video camera for converting the second zoom lens output to a video output signal.

14. The microscope of claim 1, wherein said viewing means includes a binocular eyepiece assembly for receiving the second zoom lens output to produce an optical viewing output.

15. The microscope of claim 14, wherein said viewing means includes a video camera disposed in the optical path for receiving the second zoom lens output to generate a video viewing output signal, and further comprising a redirecting element movable between a use position disposed in the optical path for redirecting the second zoom lens output from the optical path to said binocular eyepiece assembly and a non-use position disposed out of the optical path.

16. A microscope for receiving light from an object and magnifying an image of the object, said microscope comprising: an observing optical assembly having a first optical path and including an objective lens which receives light reflected from the object to produce an objective optical output having a predetermined magnification, a laser light source producing a laser beam, and a laser optical assembly for transmitting the laser beam from said source along a second optical path, said laser optical assembly including a mount and a splitter supported by the mount for movement between a use position and a non-use position, said use position being disposed in the first and second optical paths for bending the laser beam from the second optical path into the first optical path and through said objective lens to the object and for transmitting the objective optical output from the objective lens along the first optical path, said non-use position being disposed out of the first optical path.

17. The microscope of claim 16, and further comprising a bias element resiliently urging said splitter to its non-use position.

18. The microscope of claim 16, and further comprising a retainer for retaining said splitter in its use position.

* * * * *